(12) United States Patent
Yoshii et al.

(10) Patent No.: US 12,533,427 B2
(45) Date of Patent: Jan. 27, 2026

(54) RADIOACTIVE ANTITUMOR AGENT

(71) Applicant: National Institutes for Quantum Science and Technology, Chiba (JP)

(72) Inventors: Yukie Yoshii, Chiba (JP); Hiroki Matsumoto, Tokyo (JP)

(73) Assignee: NATIONAL INSTITUTES FOR QUANTUM SCIENCE & TECHNOLOGY, Chiba (JP)

( * ) Notice: Subject to any disclaimer, the term of this patent is extended or adjusted under 35 U.S.C. 154(b) by 235 days.

(21) Appl. No.: 16/758,081

(22) PCT Filed: Oct. 26, 2018

(86) PCT No.: PCT/JP2018/039865
§ 371 (c)(1),
(2) Date: Apr. 22, 2020

(87) PCT Pub. No.: WO2019/087957
PCT Pub. Date: May 9, 2019

(65) Prior Publication Data
US 2020/0360544 A1    Nov. 19, 2020

(30) Foreign Application Priority Data
Nov. 1, 2017 (JP) .................. 2017-212180

(51) Int. Cl.
*A61K 51/04* (2006.01)
*A61P 35/00* (2006.01)

(52) U.S. Cl.
CPC .......... *A61K 51/0478* (2013.01); *A61P 35/00* (2018.01)

(58) Field of Classification Search
CPC .... A61K 51/00; A61K 51/04; A61K 51/0478; A61K 2123/00; A61K 2121/00; A61P 35/00
USPC ......... 424/1.11, 1.65, 9.1, 9.2; 534/7, 10–16
See application file for complete search history.

(56) References Cited

U.S. PATENT DOCUMENTS

| | | | | |
|---|---|---|---|---|
| 9,511,155 B2 * | 12/2016 | Drummond | ........ | A61K 51/1234 |
| 2014/0186260 A1 | 7/2014 | Yoshii et al. | | |
| 2014/0186261 A1 | 7/2014 | Yoshii et al. | | |

FOREIGN PATENT DOCUMENTS

| | | |
|---|---|---|
| JP | H08245425 A | 9/1996 |
| JP | 2010013380 A | 1/2010 |
| JP | 2014129316 A | 7/2014 |
| JP | 2014141457 A | 8/2014 |
| JP | 2016210688 A | 12/2016 |

OTHER PUBLICATIONS

Zhang et al, AJR, vol. 201, pp. W698-W706 (Year: 2013).*
Bloom, Toxicologic Pathology, vol. 21, No. 2, pp. 130-134. (Year: 1993).*
Yoshii et al, Oncotarget, Sep. 28, 2017, vol. 8, No. 51, pp. 88815-88826. (Year: 2017).*
Yoshii et al, Nuclear Medicine and Biology, vol. 38, pp. 151-157. (Year: 2011).*
Basu et al, Indian Journal of Anaesthesia, vol. 58, Issue 5, pp. 529-537. (Year: 2014).*
International Preliminary Report on Patentability (Form PCT/IB/373) issued on May 5, 2020, by the International Bureau of WIPO in corresponding International Application No. PCT/JP2018/039865. (7 pages).
International Search Report (PCT/ISA/210) and an English translation thereof, and Written Opinion (PCT/ISA/237) mailed on Jan. 15, 2019, by the Japanese Patent Office as the International Searching Authority for International Application No. PCT/JP2018/039865.
Lewis, et al, "Copper-64-diacetyl-bis(N4-methylthiosemicarbazone): An agent for radiotherapy", Pros. Natl. Acad. Sci. (PNAS), Jan. 2001, vol. 98, No. 3, pp. 1206-1211.
Notice of Reasons for Refusal mailed on Sep. 10, 2019, by the Japanese Patent Office for Application No. 2019-537198, and an English translation of the Notice.
Yoshii, et al, "Copper-64-diacetyl-bis ($N^4$-methylthiosemicarbazone) accumulates in rich regions of CD133+ highly tumorigenic cells in mouse colon carcinoma", Nucl. Med. Biol. 2010 (month unknown), vol. 37, pp. 395-404.
Yoshii, et al, "$^{64}$Cu-ATSM therapy targets regions with activated DNA repair and enrichment of co133+ cells in an HT-29 tumor model: Sensitization with a nucleic acid antimetabolite", Cancer Lett., 2016 (month unknown), vol. 376, pp. 74-82.
Yoshii, et al., "Internal radiotherapy with copper-64-diacetyl-bis($N^4$-methylthiosemicarbazone) reduces CD133+ highly tumorigenic cells and metastatic ability of mouse colon carcinoma", Nucl. Med. Biol., 2011 (month unknown), vol. 38, pp. 151-157.
Yoshii, et al., "Multiple Administrations of $^{64}$Cu-ATSM as a Novel Therapeutic Option for Glioblastoma: a Translational Study Using Mice with Xenografts", Translational Oncology, Feb. 2018, vol. 11, No. 1, pp. 24-30.
The First Office Action issued May 24, 2022, by the State Intellectual Property Office of the People's Republic of China in corresponding Chinese Patent Application No. 201880069268.7 and an English translation of the Action. (10 pages).
Disease Models and Experimental Pathology, Ed. Li, et al., Jilin University Press, Dec. 31, 2002, pp. 20-26. (11 pages).
Office Action (Rejection Decision) issued Apr. 28, 2023, by the State Intellectual Property Office of People's Republic of China in corresponding Chinese Patent Application No. 201880069268.7 and an English translation of the Office Action. (8 pages).

* cited by examiner

*Primary Examiner* — D. L. Jones
(74) *Attorney, Agent, or Firm* — Panitch Schwarze Belisario & Nadel LLP

(57) ABSTRACT

This radioactive antitumor agent comprises a radioactive dithiosemicarbazone-copper complex as an active ingredient, and is characterized by being used in such a way that the radioactive dithiosemicarbazone-copper complex is administered multiple times to an organism requiring tumor treatment, at a radioactive dose that avoids dose-limiting toxicity, as determined on the basis of hematological parameters. The multiple administration preferably consists of intermittent administration at time intervals allowing the hematological parameters to return to a normal range.

6 Claims, 7 Drawing Sheets

RADIOACTIVE ANTITUMOR AGENT

TECHNICAL FIELD

The present invention relates to a radiotherapy of tumors using a radioactive dithiosemicarbazone-copper complex.

BACKGROUND ART

Radioactive dithiosemicarbazone-copper complexes are known as diagnostic agents for hypoxic sites and mitochondrial dysfunction (for example, Patent Literature 1). Also, non-Patent Literature 1 describes that radioactive Cu-ATSM, a radioactive dithiosemicarbazone-copper complex, is useful as a radiotherapeutic agent for tumors, targeting hypoxic regions.

It has also become apparent in recent years that $^{64}$Cu-ATSM accumulates in CD133-positive cells (Non-Patent Literature 2). Non-Patent Literatures 3 and 4 have reported that $^{64}$Cu-ATSM was used to reduce CD133-positive cells in tumors and was able to shrink tumors. Based on these, radioactive Cu-ATSM is also expected to be useful as a detection agent for cancer stem cells, and as a prevention or treatment agent for cancers, targeting cancer stem cells (Patent Literatures 2 to 4).

CITATION LIST

Patent Literature

Patent Literature 1: Japanese Unexamined Patent Publication No. H8-245425
Patent Literature 2: Japanese Unexamined Patent Publication No. 2010-13380
Patent Literature 3: Japanese Unexamined Patent Publication No. 2014-141457
Patent Literature 4: Japanese Unexamined Patent Publication No. 2016-210688

Non-Patent Literature

Non-Patent Literature 1: Jason S. Lewis et al (2001), Pros. Natl. Acad. Sci. vol. 98, 1206-1211
Non-Patent Literature 2: Yukie Yoshii et al (2010), Nucl. Med. Biol. vol. 37, 395-404
Non-Patent Literature 3: Yukie Yoshii et al (2011), Nucl. Med. Biol. vol. 38, 151-157
Non-Patent Literature 4: Yukie Yoshii et al (2016), Cancer Lett. vol. 376, 74-82

SUMMARY OF INVENTION

However, in the case of glioblastoma, one of the worst prognostic malignant brain tumors, it is found that there is the problem of dose limitation because body weight loss and hematotoxicity occur when a therapeutically effective dose of radioactive Cu-ATSM is administered. Furthermore, in Non-Patent Literature 1, 4 mCi of $^{64}$Cu-ATSM was administered three times at intervals of 72 hours to large intestine cancer cell-transplanted hamsters, but it cannot be deemed that the therapeutic effect was sufficient.

Considering the above circumstances, the present invention has been made, aiming at providing a technique for enhancing an antitumor effect of a radioactive dithiosemicarbazone-copper complex.

The present inventors have found that multiple administration of a radioactive dithiosemicarbazone-copper complex at low dose enables effective radiotherapy for a tumor such as glioblastoma, and completed the present invention.

Thus, one aspect of the present invention provides a radioactive antitumor agent comprising a radioactive dithiosemicarbazone-copper complex as an active ingredient, which is used in multiple administration of the radioactive dithiosemicarbazone-copper complex to a living body in need of treatment of a tumor at a radioactive dose that avoids dose-limiting toxicity as determined on the basis of a hematological parameter.

Another aspect of the present invention provides use of a radioactive dithiosemicarbazone-copper complex for production of a radioactive antitumor agent which is used in multiple administration of the radioactive antitumor agent to a living body in need of treatment of a tumor at a radioactive dose that avoids dose-limiting toxicity as determined on the basis of a hematological parameter.

Still another aspect of the present invention provides a method which comprises performing multiple administration of a radioactive antitumor agent comprising a radioactive dithiosemicarbazone-copper complex as an active ingredient to a living body in need of treatment of a tumor at a radioactive dose that avoids dose-limiting toxicity as determined on the basis of a hematological parameter.

According to the present invention, the multiple administration is performed such that a dose of the radioactive dithiosemicarbazone-copper complex per administration is a radioactive dose that avoids dose-limiting toxicity as determined on the basis of a hematological parameter. Thus, the antitumor effect of the radioactive dithiosemicarbazone-copper complex can be maintained continuously while keeping a balance between the toxicity and the tumor suppressive effect.

DESCRIPTION OF EMBODIMENTS

Radioactive Antitumor Agent

Figure 1A:
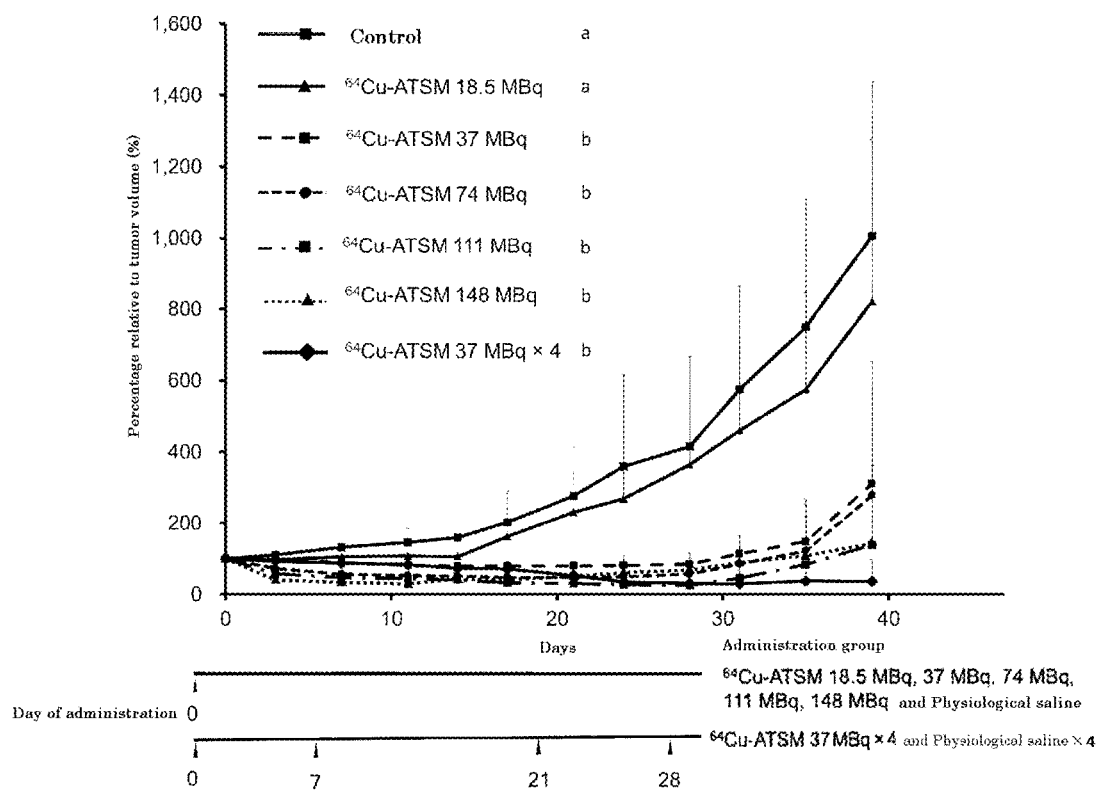
FIG. 1A is a graph showing changes in tumor volume ratio (a percentage relative to tumor volume on day 0) over 39 days for each administration group, as measured in the Examples.

In the present invention, "antitumor" refers to suppressing an increase of a tumor, and further, reducing or eliminating a tumor. The "antitumor agent" of the present invention refers to an agent containing an active ingredient that kills a tumor cell, suppresses tumor growth, or further is capable of reducing or eliminating a tumor.

The radioactive antitumor agent of the present invention can be applied to a variety of tumors. Examples of the tumors to which the radioactive antitumor agent of the present invention is applied include a brain tumor including a malignant brain tumor such as malignant glioblastoma, breast cancer, prostate cancer, pancreatic cancer, gastric cancer, lung cancer, colon cancer, rectal cancer, large intestine cancer, small intestine cancer, esophageal cancer, duodenal cancer, tongue cancer, pharyngeal cancer, salivary gland cancer, neurofibroma, liver cancer, kidney cancer, biliary duct cancer, uterine cancer, cervical cancer, ovarian cancer, bladder cancer, skin cancer, hemangioma, malignant lymphoma, malignant melanoma, thyroid cancer, parathyroid cancer, nasal cancer, sinus cancer, bone tumor, angiofibroma, retinal sarcoma, penile cancer, testicular tumor, pediatric solid cancer, sarcoma, and leukemia. These tumors may be primary or metastatic.

In the present invention, "dose-limiting toxicity" refers to a hematotoxicity, sustained for seven days or more and not dependent on progression of the original disease, of Grade 3 (advanced adverse events requiring hospitalization or invasive treatment/interventional radiology (IVR)/transfusion/therapeutic endoscopy/surgery, or the like) or higher; a non-hematotoxicity, sustained for seven days or more, not lightened by symptomatic therapy, and not dependent on the original disease, of Grade 3 or higher; or a nervous system disorder, not dependent on progression of the original disease, of Grade 3 or higher, excluding epileptic attacks. Here, the "Grade" indicates a Grade 1 to Grade 5 classification as defined in Common Terminology Criteria for Adverse Events; CTCAE v.4.0.

In the present invention, the "radioactive dose that avoids dose-limiting toxicity as determined on the basis of a hematological parameter" refers to a radioactive dose at which no significant decrease in two or more kinds of blood cell counts is observed when a clinical test is performed and then a significant difference test at any significant level is performed, and preferably refers to a radioactive dose at which no significant decrease in two or more kinds of blood cell counts selected from the group consisting of white blood cell count, red blood cell count and platelet count is observed.

Specifically, the radioactive dose refers to 7.5 MBq or more and 111 MBq or less, preferably 25 MBq or more and 50 MBq or less per mouse, which corresponds to 30 MBq/kg or more and 450 MBq/kg or less, preferably 100 MBq/kg or more and 200 MBq/kg or less in terms of human equivalent.

Here, the human equivalent is a numerical value calculated according to "dose per mouse (MBq/body)×(1000/20)/12.4", assuming that a mouse body weight is 20 g, and a body surface area conversion factor is 12.4.

Note that the significant difference test includes a parametric test or non-parametric test. Examples of the parametric test include a Student's t-test, a variance analysis (one-way analysis of variance, and two-way analysis of variance), and a multicomparison analysis. Examples of the non-parametric test include a Mann-Whitney's U-test, a Wilcoxon rank sum test, a Kruskal-Wallis test, a Friedman test, and a log rank test. However, the test method is not limited to these, and any well-known method for testing the difference between an average or representative value and data can be used.

The radioactive antitumor agent of the present invention may be formulated with the radioactive dithiosemicarbazone-copper complex represented by formula (1) below as it is or along with a pharmacologically acceptable carrier, diluent, or excipient. The dosage form may be for either oral or parenteral administration, but the dosage form for parenteral administration, such as an injectable, is preferred.

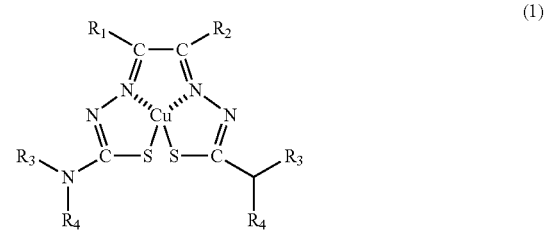

(1)

The substituents $R_1$, $R_2$, $R_3$, $R_4$ in the formula (1) are each independently selected from the group consisting of a hydrogen atom, an alkyl group, and an alkoxy group. In the present invention, the carbon number of alkyl and alkoxy groups of substituents $R_1$, $R_2$, $R_3$, $R_4$ in the formula (1) is preferably an integer of 1 to 5, more preferably an integer of 1 to 3. In the present invention, it is preferable in the formula (1) that the substituents $R_1$, $R_2$, $R_3$, $R_4$ which may be the same or different are a hydrogen atom or an alkyl group having a carbon number of 1 to 3. It is more preferable that $R_1$ and $R_2$ which may be the same or different are a hydrogen atom or an alkyl group having a carbon number of 1 to 3, $R_3$ is a hydrogen atom, and $R_4$ is an alkyl group having a carbon number of 1 to 3. It is furthermore preferable that $R_1$ and $R_2$ which may be the same or different are a hydrogen atom or a methyl group, $R_3$ is a hydrogen atom and $R_4$ is a methyl group.

The radioisotope of copper in the formula (1) is preferably $^{61}$Cu, $^{62}$Cu, $^{64}$Cu or $^{67}$Cu, and more preferably $^{64}$Cu or $^{67}$Cu. Since $^{64}$Cu and $^{67}$Cu also emit short range β rays, which destroy cells, they can further enhance the antitumor effect.

Specific examples of the radioactive dithiosemicarbazone-copper complex represented by the above formula (1) include
 radioactive glyoxal-bis(N4-methylthiosemicarbazone) copper complex,
 radioactive glyoxal-bis(N4-dimethylthiosemicarbazone) copper complex,
 radioactive ethylglyoxal-bis(N4-methylthiosemicarbazone) copper complex,
 radioactive ethylglyoxal-bis(N4-ethylthiosemicarbazone) copper complex,
 radioactive pyruvaldehyde-bis(N4-methylthiosemicarbazone) copper complex,
 radioactive pyruvaldehyde-bis(N4-dimethylthiosemicarbazone) copper complex,
 radioactive pyruvaldehyde-bis(N4-ethylthiosemicarbazone) copper complex,
 radioactive diacetyl-bis(N4-methylthiosemicarbazone) copper complex,
 radioactive diacetyl-bis(N4-dimethylthiosemicarbazone) copper complex, and
 radioactive diacetyl-bis(N4-ethylthiosemicarbazone) copper complex. Among these, the radioactive diacetyl-bis(N4-methylthiosemicarbazone) copper complex represented by formula (2) below (also referred to herein as radioactive Cu-ATSM)) or radioactive pyruvaldehyde-bis(N4-dimethylthiosemicarbazone) copper complex (also referred to herein as radioactive Cu-PTSM) is preferred, and radioactive Cu-ATSM is more preferred.

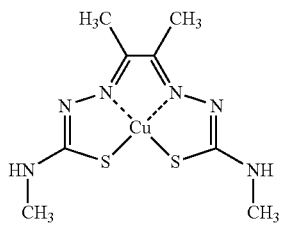

(2)

In the formula (2), Cu denotes the radioisotope of copper, preferably $^{64}$Cu or $^{67}$Cu. Note that radioactive Cu-ATSM wherein Cu in the formula (2) is $^{64}$Cu is also referred to herein as $^{64}$Cu-ATSM.

The radioactive antitumor agent of the present invention can be produced, for example, by the following methods.

First, a dithiosemicarbazone derivative is synthesized by the method described in Petering et al. (Cancer Res., 24, 367-372, 1964). Specifically, an aqueous solution or 50% by volume ethanol solution of 1 mol α-ketoaldehyde is added dropwise at 50° C. to 60° C. over 30 to 40 minutes to a 5% ice-acetic acid solution containing 2.2 mol thiosemicarbazide, N4-methylthiosemicarbazide, N4-dimethylthiosemicarbazide or the like. During the dropwise addition, the reaction solution is stirred. After the dropwise addition, the reaction solution is left at room temperature for several hours, and then cooled to separate crystals. The crystals are then dissolved in methanol, and purified by recrystallization.

Next, radioactive copper ions are produced. Radioactive copper ions can be produced by known methods. $^{64}$Cu ion can be obtained, for example, by the method of McCarthy et al. (Nuclear Medicine and Biology, vol. 24(1), 1997, pp. 35-43), or by the method of Obata et al. (Nuclear Medicine and Biology, vol. 30(5), 2003, pp. 535-539). $^{67}$Cu ion can be obtained, for example, by producing $^{67}$Cu from $^{68}$Zn (p, 2p)$^{67}$Cu reaction, and then chemically separating $^{67}$Cu ions from the target by ion chromatography or the like.

The radioactive dithiosemicarbazone-copper complex represented by the formula (1) can then be obtained by contacting the dithiosemicarbazone derivative in a dimethylsulfoxide (DMSO) solution with a solution containing the radioactive copper ion. The radioactive Cu-ATSM can be produced, for example, by the method of Jalilian et al. (Acta Pharmaceutica, 59(1), 2009, pp. 45-55), the method described in "Manufacture and Quality Control of Radioactive Agents for PET—a guide to Synthesis and Clinical Use" (edited by PET Chemistry Workshop) 4th edition (rev. 2011), the method of Tanaka et al. (Nuclear Medicine and Biology, vol. 33, 2006, pp. 743-50), or the method of Lewis et al. (J. Nucl. Med., 2001, 42, 655-661).

In the present invention, the radioactive antitumor agent is repeatedly administered at a predetermined dose. In the present invention, the "multiple administration" means administering two or more times at certain time intervals, including, for example, single or multiple administration per day, or single administration per multiple days, which is continued for a period of from two days to one month. In the present invention, the "multiple administration" may be performed by intermittent administration at a time interval during which the hematological parameter recovers to a normal range, preferably at a time interval during which the hematological parameter recovers to be equal to the hematological parameter before administration.

The subject of administration of the radioactive antitumor agent of the present invention is a living body, for example, a mammal, preferably, a human, in need of treatment of a tumor. The dose per administration of the radioactive antitumor agent of the present invention is different depending on the time interval of administration, the type of patient to be administered, age, sex, body weight, symptom, method of administration, or the like, and not particular limited as long as it is a dose equivalent to a radioactive dose at which the radioactive dithiosemicarbazone-copper complex avoids dose-limiting toxicity as determined on the basis of a hematological parameter (for example, white blood cell count, red blood cell count and platelet count). Besides, the dose may be set, for example, as a dose equivalent to a radioactive dose at which the body weight loss rate from the time of administration to the time of the next administration of the radioactive antitumor agent is equal to or less than 10%. These doses can increase the effect of killing tumor cells while reducing the side effects of the radioactive antitumor agent. The body weight loss rate can be expressed as "body weight loss rate (%)={(A−B)/A}×100" in which A denotes body weight before start of administration of the radioactive antitumor agent, and B denotes body weight after start of administration of the radioactive antitumor agent, and the "body weight after start of administration of the radioactive antitumor agent" may preferably be a body weight 3 days to 2 weeks after start of administration of the radioactive antitumor agent.

EXAMPLES

Hereinafter, the present invention is explained in further detail by way of Examples, but the present invention is not limited to these details.

Production Example 1: Preparation of $^{64}$Cu-ATSM
Synthesis of ATSM

Synthesis of diacetyl-bis(N4-methylthiosemicarbazone) (ATSM) was performed in accordance with the method of Tanaka et al. (Nuclear Medicine and Biology, vol. 33, 2006, pp. 743-50).

Synthesis of $^{64}$Cu-ATSM $^{64}$Cu was produced and purified in accordance with the method of McCarthy et al. (Nuclear medicine and biology, vol. 24, 1997, pp. 35-43) and the method of Obata et al. (Nuclear medicine and biology, vol. 30, 2003, pp. 535-539). ATSM and $^{64}$Cu were used to synthesize $^{64}$Cu-ATSM in accordance with the method of Tanaka et al. supra. Furthermore, the produced agent was tested by a thin-layer chromatography method (TLC method), and the agent with radiochemical purity of 95% or more was used for the following experiments. Note that the conditions for analysis of $^{64}$Cu-ATSM with the TLC are as follows.

TLC Plate: silica gel plate (Product Name: Silica gel 60, Merck KGaA)
Development phase: ethyl acetate
Detection: fluoroimage analyzer (System: FLA-7000, Fujifilm Corporation)

Example 1: Antitumor Effect of Administration of $^{64}$Cu-ATSM to U87MG Tumor-Bearing Mouse U87MG cells from human glioblastoma were purchased from ATCC, and utilized after growing. A U87MG tumor-bearing model was made by implanting 1×10$^7$ U87MG cells subcutaneously into the flanks of BALB/c nude mouse (male, 6 weeks old, weighing approximately 20 to 25 g, obtained from Japan SLC). The tumor-bearing mice were subjected to tests when the tumor diameter reached around 5 mm after transplantation of U87MG cells.

The tumor-bearing mice were randomized into six groups (n=7/group), and were intravenously administered with different single doses of $^{64}$Cu-ATSM with 18.5, 37, 74, 111 and 148 MBq, and physiological saline as a control, respectively. To the remaining one group, $^{64}$Cu-ATSM was administered intravenously at a dose of 37 MBq on days 0, 7, 21 and 28 of four times in total (37 MBq×4).

In each of the following evaluations, data were presented as mean value±standard deviation. Two-way analysis of variance was used in the significant difference test of the data, excluding the survival curve. A Log-rank test was used for the data of the survival curve. Significant levels used were all 5%.

Evaluation 1: Tumor Growth

After the start of the study, mice were weighed twice a week over time, and the size of the tumor was measured with a caliper. The tumor volume was calculated with the formula: tumor volume=length×width$^2$×π/6, and the tumor volume on each day was expressed as a percentage relative to the initial tumor volume on day 0. The results are shown in FIG. 1A. The initial tumor volume is also shown in Table 1.

TABLE 1

Initial tumor volume

| Dose and frequency of administration | | Initial tumor volume (mm$^3$)[1] |
|---|---|---|
| Control | | 53.71 ± 8.38 |
| $^{64}$Cu-ATSM 18.5 MBq | Once | 52.80 ± 9.39 |
| $^{64}$Cu-ATSM 37 MBq | Once | 63.12 ± 10.92 |
| $^{64}$Cu-ATSM 74 MBq | Once | 53.21 ± 10.07 |
| $^{64}$Cu-ATSM 111 MBq | Once | 60.50 ± 16.19 |
| $^{64}$Cu-ATSM 148 MBq | Once | 53.93 ± 9.51 |
| $^{64}$Cu-ATSM 37 MBq | Four times | 57.39 ± 16.29 |

Note 1:
There were no significant differences among groups.

FIG. 1A is a graph showing changes in tumor volume ratio (a percentage relative to tumor volume on day 0) of each administration group for 39 days. FIG. 1A shows that the single administration of $^{64}$Cu-ATSM at 37, 74, 111 and 148 MBq significantly inhibited tumor growth compared to the control group. The rates of each tumor volume ratio of the $^{64}$Cu-ATSM 37, 74, 111 and 148 MBq single administration groups to a tumor volume ratio of the control group on day 39 were 0.82, 0.31, 0.28, 0.14 and 0.14, respectively. Thus, single administration of $^{64}$Cu-ATSM had a dose-dependent antitumor effect, showing a plateau at 111 MBq. Single administration of $^{64}$Cu-ATSM of 18.5 MBq inhibited tumor growth compared to the control group, but showed no significant difference. When $^{64}$Cu-ATSM was administered four times at 37 MBq (37 MBq×4), a significantly greater inhibition effect of tumor growth was shown compared to the control group. The rate of the tumor volume ratio of the $^{64}$Cu-ATSM 37 MBq four-time administration group (37 MBq×4) to that of the control group on day 39 was 0.04, which was the lowest value among all the administration groups.

Figure 1B:
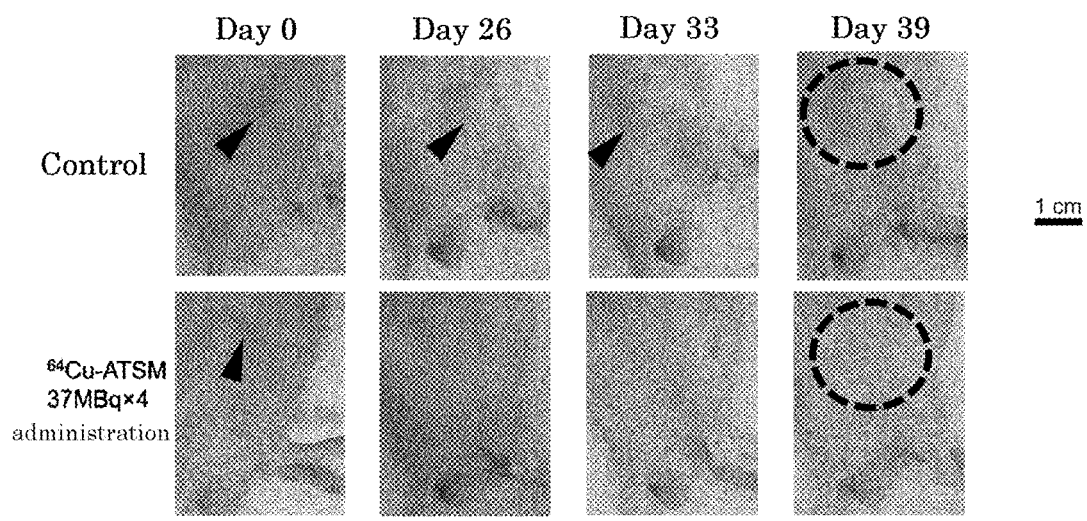
FIG. 1B is a set of photographs showing representative tumor appearance on days 0 (before administration), 26, 33 and 39 of the control group and the group administered with $^{64}$Cu-ATSM four times (37 MBq×4).

FIG. 1B is photographs showing representative examples of tumor appearance of the control group and the $^{64}$Cu-ATSM 37 MBq four-time administration group (37 MBq×4) on days 0 (before administration), 26, 33 and 39. FIG. 1B shows that tumors markedly grew over time in the control group, while tumors were not visible after multiple administration in accordance with the $^{64}$Cu-ATSM 37 MBq four-time administration (37 MBq×4), and as shown in FIG. 1B, tumors were nearly invisible even on day 39 in 6 cases among 7 mice.

Evaluation 2: Survival Curve

After the start of the study, the mice were slaughtered at the time when the tumor volume reached the humanitarian endpoint. Survivability for 80 days was observed, and the survival rate was calculated. The results are shown in FIG. 2.

Figure 2:
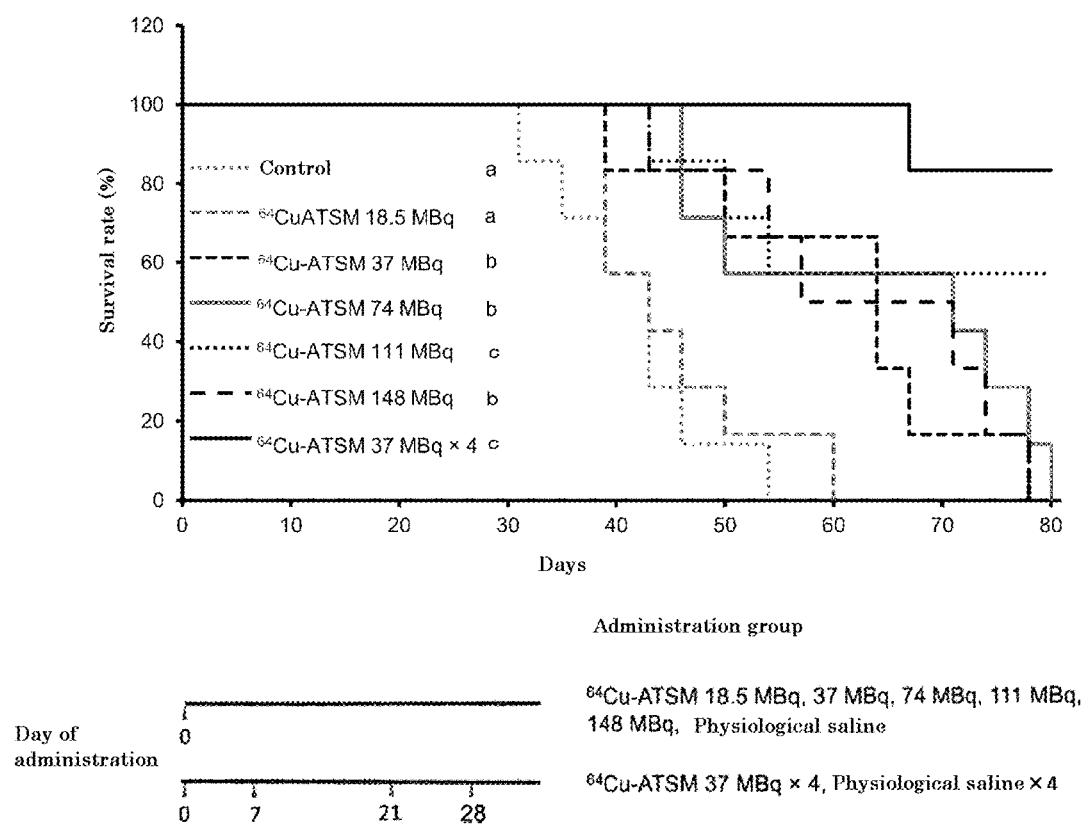
FIG. 2 is a graph showing a survival curve for 80 days of each administration group in the Examples.

FIG. 2 is a graph showing a survival curve of each administration group in the Examples for 80 days. FIG. 2 shows that the survival rates of the $^{64}$Cu-ATSM 37, 74, 111 and 148 MBq single administration groups and the multiple administration group in accordance with the $^{64}$Cu-ATSM 37 MBq four-time administration (37 MBq×4) were higher than that of the control group. In addition, the $^{64}$Cu-ATSM 111 MBq single administration group and the multiple administration group in accordance with the $^{64}$Cu-ATSM 37 MBq four-time administration (37 MBq×4) showed a significantly longer survival time compared to the $^{64}$Cu-ATSM 18.5, 37, 74 and 148 MBq single administration groups. Of the single administration groups, the 111 MBq single administration group showed the highest survival effect. The multiple administration group in accordance with $^{64}$Cu-ATSM 37 MBq four-time administration (37 MBq×4) showed a longer survival time than the 111 MBq single administration group, but no significant difference was shown between these two groups.

Evaluation 3: Body Weight Change

Figure 3:
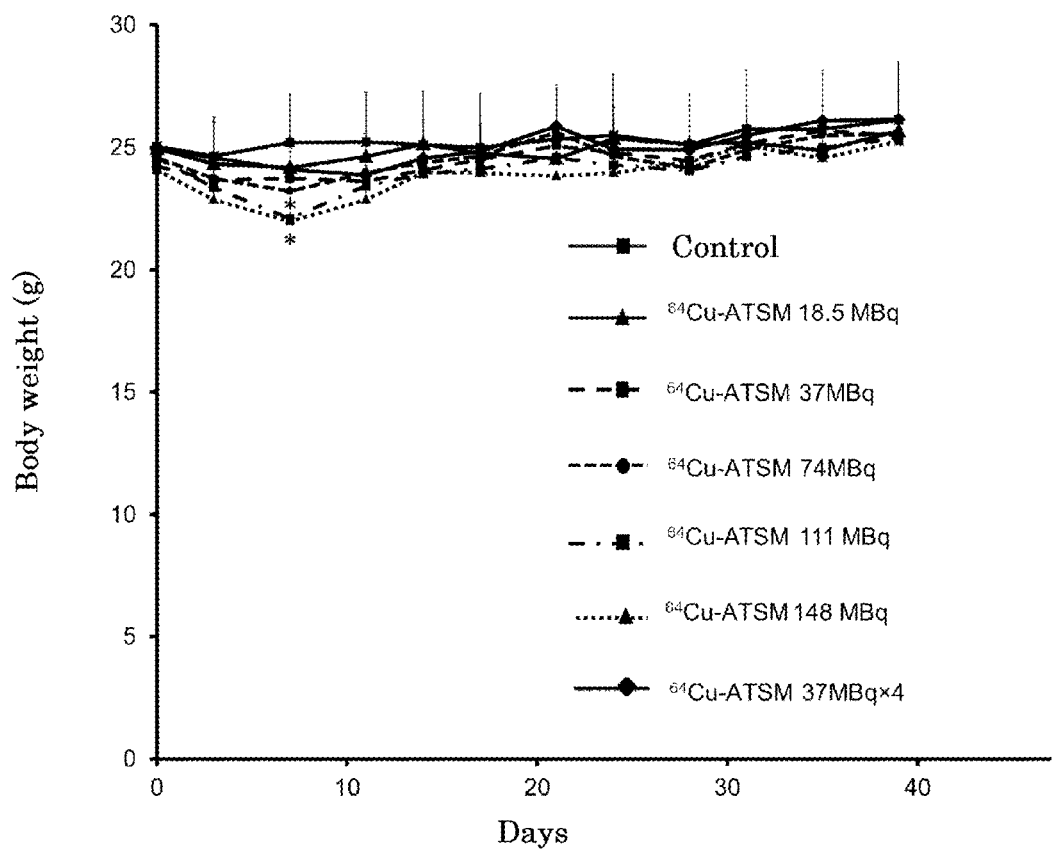
FIG. 3 is a graph showing body weight changes up to day 39 of mice in each administration group in the Examples. In the figure, "*" indicates data showing a significant difference when a significant difference test was performed.

FIG. 3 shows body weight changes in mice in each administration group, which were measured in Evaluation 1 after the start of the study.

FIG. 3 shows that the body weight of mice in the $^{64}$Cu-ATSM 111 and 148 MBq single administration groups was significantly reduced on day 7 compared to that in the control group, but then returned to normal body weight by day 14, and thereafter the body weight was similar to that of the control. No body weight loss was observed in the multiple administration group with the $^{64}$Cu-ATSM 37 MBq four-time administration (37 MBq×4).

Evaluation 4: Measurement of Hematological Parameters

To evaluate side effects, hematological parameters were measured using non-tumor-bearing mice (n=5/group) treated in a manner similar to the tumor-bearing mice described above.

The measurement of hematological parameters was performed by measuring concentrations of white blood cells, red blood cells and platelets using blood collected from the vein at the start point (day 0) immediately before administration of $^{64}$Cu-ATSM and on days 2, 7, 14, 21, 28, 35, 42 and 49 after administration of $^{64}$Cu-ATSM, with a blood analyzer (Celltac MEK-6458, manufactured by NIHON KOHDEN CORPORATION). The results are shown in FIGS. 4A to 4C.

Figure 4A:
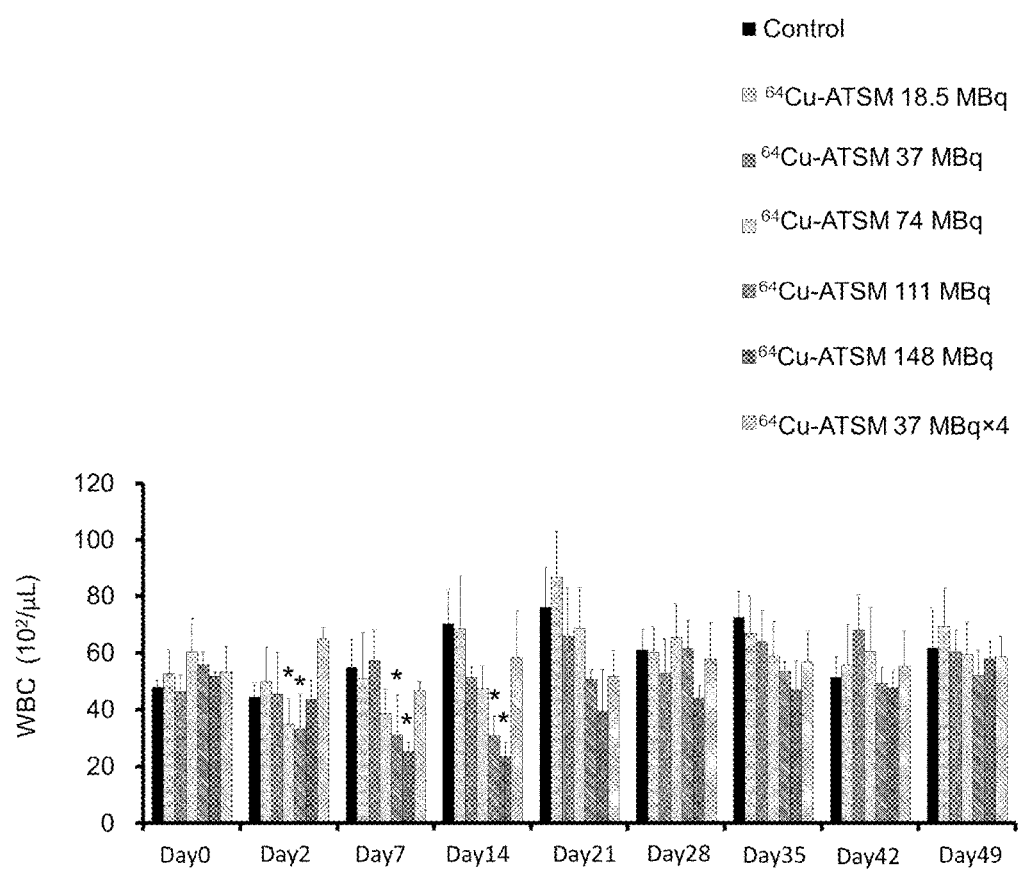
FIG. 4A is a graph showing changes in the number of white blood cells (WBC) measured in the Examples, where "Control" means a control and "Day X" means day X (where X is an integer). In the bar graph, the bars on each day show the results of "Control", "$^{64}$Cu-ATSM 18.5 MBq single administration", "$^{64}$Cu-ATSM 37 MBq single administration", "$^{64}$Cu-ATSM 74 MBq single administration", "$^{64}$Cu-ATSM 111 MBq single administration", "$^{64}$Cu-ATSM 148 MBq single administration", and "$^{64}$Cu-ATSM 37 MBq four-time administration", in order from left. In the figure, "*" indicates data showing a significant difference when a significant difference test was performed.

The graph of FIG. 4A shows that significant reductions in the number of white blood cells were observed in the $^{64}$Cu-ATSM 74 and 111 MBq single administration groups on day 2 after administration, and significant reductions in the number of white blood cells were observed in the $^{64}$Cu-ATSM 111 and 148 MBq single administration groups on days 7 and 14 after administration, but all the values recovered to normal on day 21.

Figure 4B:
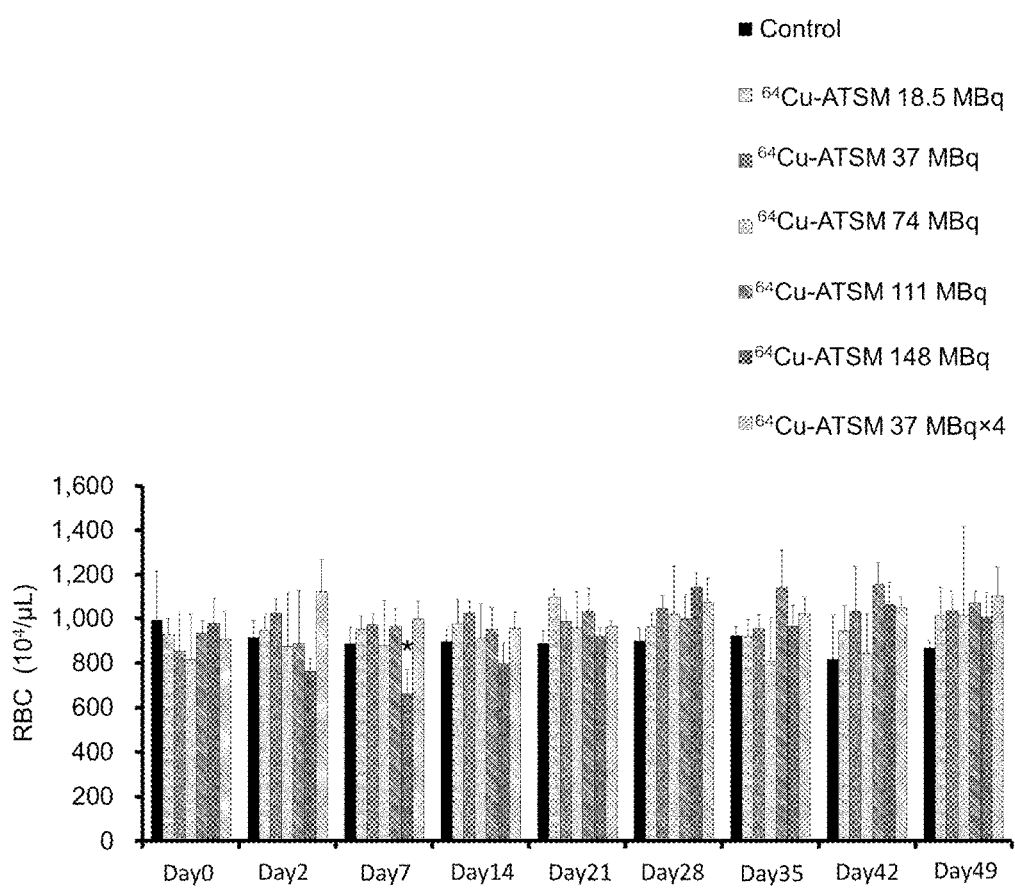
FIG. 4B is a graph showing changes in the number of red blood cells (RBC) measured in the Examples, where "Control" means a control and "Day X" means day X (where X is an integer). In the bar graph, the bars on each day show the results of "Control", "$^{64}$Cu-ATSM 18.5 MBq single administration", "⁶⁴Cu-ATSM 37 MBq single administration", "⁶⁴Cu-ATSM 74 MBq single administration", "⁶⁴Cu-ATSM 111 MBq single administration", "⁶⁴Cu-ATSM 148 MBq single administration", and "⁶⁴Cu-ATSM 37 MBq four-time administration", in order from left. In the figure, "*" indicates data showing a significant difference when a significant difference test was performed.

The graph of FIG. 4B shows that a significant reduction in the number of red blood cells was observed in the $^{64}$Cu-ATSM 148 MBq single administration group on day 7 after administration, but the value recovered to normal on day 14.

Figure 4C:
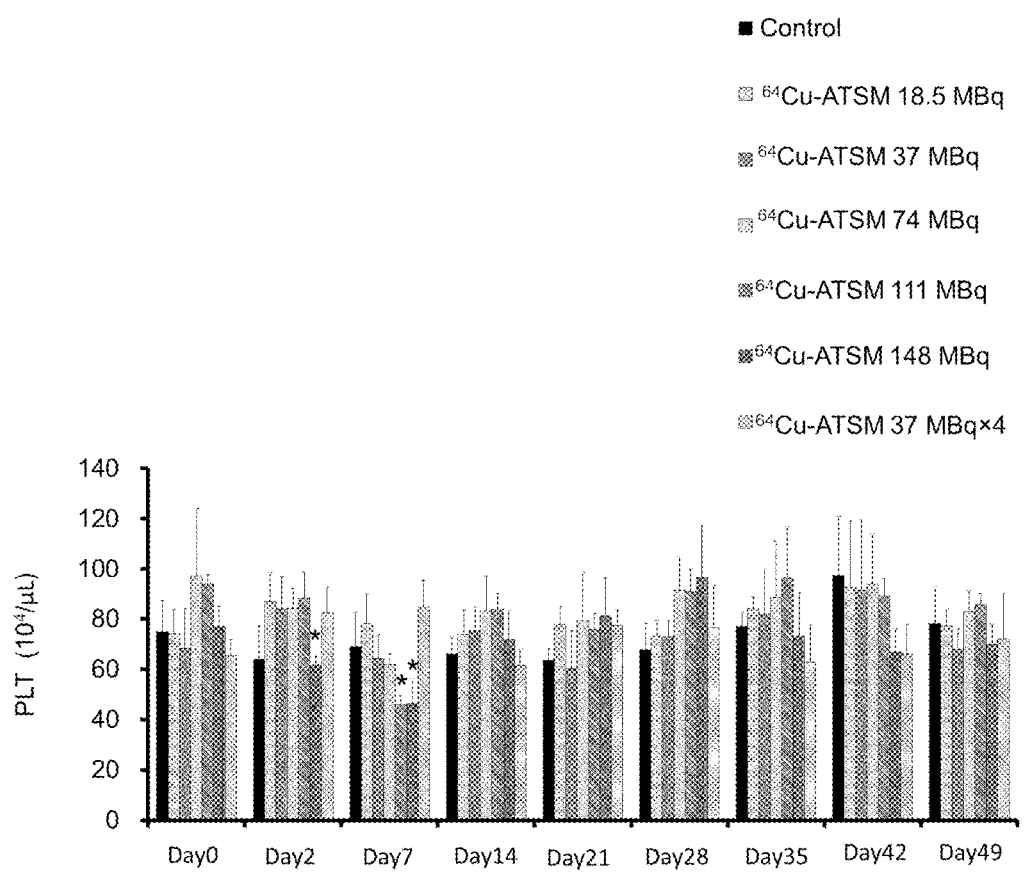
FIG. 4C is a graph showing changes in the number of platelets (PLT) measured in the Examples, where "Control" means a control and "Day X" means day X (where X is an integer). In the bar graph, the bars on each day show the results of "Control", "⁶⁴Cu-ATSM 18.5 MBq single administration", "⁶⁴Cu-ATSM 37 MBq single administration", "⁶⁴Cu-ATSM 74 MBq single administration", "⁶⁴Cu-ATSM 111 MBq single administration", "⁶⁴Cu-ATSM 148 MBq single administration", and "⁶⁴Cu-ATSM 37 MBq four-time administration", in order from left. In the figure, "*" indicates data showing a significant difference when a significant difference test was performed.

The graph of FIG. 4C shows that significant reductions in the number of platelets were observed in the $^{64}$Cu-ATSM 148 MBq single administration group on days 2 and 7 after administration, and a significant reduction in platelets was observed in the $^{64}$Cu-ATSM 111 MBq single administration group on day 7 after administration, but the values recovered to normal on day 14.

FIGS. 4A, 4B and 4C show that, in the multiple administration group with the $^{64}$Cu-ATSM 37 MBq four-time administration (37 MBq×4), no symptoms of hematological toxicity were observed, and a healthy physical appearance was maintained throughout the study period.

Evaluation 5: Measurement of Biochemical Parameters

To evaluate side effects, biochemical parameters were measured using non-tumor-bearing mice (n=5/group) treated in a manner similar to the tumor-bearing mice described above.

The measurements of biochemical parameters were performed by measuring amounts of glutamate pyruvate transaminase and alkaline phosphatase for liver function and amounts of urea nitrogen and creatinine for renal function using mouse plasma prepared from blood collected from heart on day 49 after the first administration of $^{64}$Cu-ATSM, with a blood biochemical analyzer (FUJI DRI-CHEM 7000VZ, manufactured by FUJIFILM Corporation). The results are shown in FIGS. 5A and 5B.

Figure 5A:
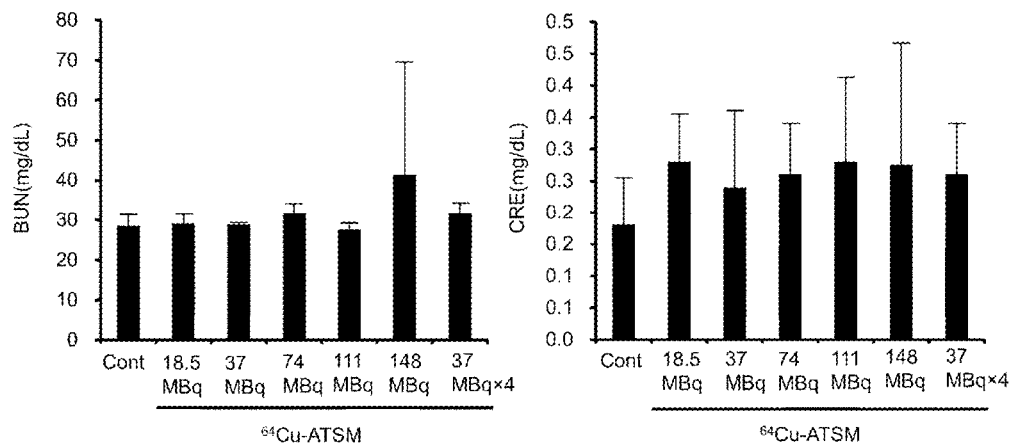
FIG. 5A is a graph showing changes in biochemical parameters measured in the Examples; changes in urea nitrogen (BUN) on the left side, and changes in creatinine (CRE) on the right side. In the figure, "Cont" means a control.
Figure 5B:
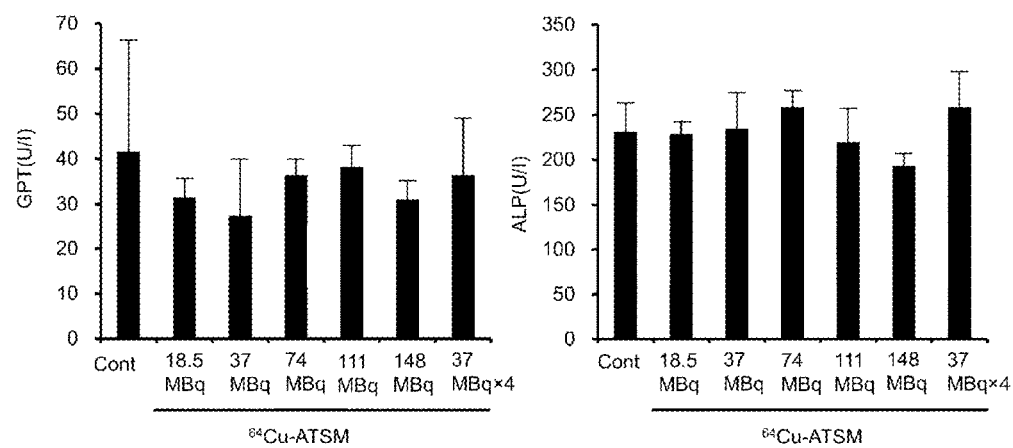
FIG. 5B is a graph showing changes in biochemical parameters measured in the Examples; changes in glutamate pyruvate transaminase (GPT) on the left side, and changes in alkaline phosphatase (ALP) on the right. In the figure, "Cont" means a control.

FIGS. 5A and 5B show that 49 days after administration, no significant differences were observed in the amounts of blood urea nitrogen (BUN) and creatinine (CRE) relating to renal function and in the amounts of glutamate pyruvate transaminase (GPT) and alkaline phosphatase (ALP) relating to liver function compared to control (Cont) in any administration group. This means that there were no changes in liver and renal functions in any of the $^{64}$Cu-ATSM administration groups.

DISCUSSION

As mentioned above, the single administration of $^{64}$Cu-ATSM had a dose-dependent therapeutic effect, significantly inhibited tumor growth and also had a life-extending effect against U87MG glioblastoma, but slightly showed dose-dependent hematological toxicity and body weight loss. In contrast, the multiple administration of $^{64}$Cu-ATSM (37 MBq×4) inhibited tumor growth and also had a life-extending effect against U87MG glioblastoma, thereby showing better antitumor effects without any significant side effect. In view of the absence of any therapy effective for glioblastoma, the multiple administration of $^{64}$Cu-ATSM according to the present invention can be a new therapy for treating this fatal disease with little or no side effects.

More specifically, the single administration of $^{64}$Cu-ATSM showed a dose-dependent therapeutic effect during 39 days, especially the 111 and 148 MBq single administration groups significantly inhibited tumor growth compared to the control group. However, only the 111 MBq single administration group showed a significant life-extending effect compared to the control group. Slight body weight loss as well as significant reductions in the number of white blood cells and the number of platelets were shown in the $^{64}$Cu-ATSM 111 and 148 MBq single administration groups. Furthermore, a toxicity, namely, a significant decrease in the number of red blood cells, was shown in the 148 MBq single administration group. This toxicity might have impaired the life-extending effect.

According to the multiple administration of $^{64}$Cu-ATSM (37 MBq×4) of the present invention, significant tumor-inhibiting and life-extending effects are obtained compared to the control, and the therapeutic effect of $^{64}$Cu-ATSM can be enjoyed with reduced or little accompanying side effects. Furthermore, the multiple administration of $^{64}$Cu-ATSM (37 MBq×4) according to the present invention causes neither body weight loss nor toxicity to blood, liver, or kidney. Thus, according to the multiple administration of $^{64}$Cu-ATSM of the present invention, tumor growth can be effectively inhibited, a life-extending effect against a tumor such as glioblastoma can be obtained, and furthermore, toxicity due to $^{64}$Cu-ATSM administration can be reduced.

Glioblastoma is typically accompanied by malfunctions of the vascular system, which leads to hypoxia. In the U87MG tumor-bearing mice used in the above Examples as a model, HIF-1α is highly expressed due to hypoxia. Hypoxic environments in glioblastoma tissues induce HIF-1α, leading to malignant behaviors such as tumor regrowth and metastasis. Clinical PET investigations have indicated that $^{64}$Cu-ATSM accumulates in highly malignant grade glioblastoma showing high HIF-1α expression. $^{64}$Cu-ATSM can target hypoxic regions in tumor tissues even when blood perfusion is limited. β-particles and Auger electrons emitted by $^{64}$Cu can damage tumor cells. Particularly, high-LET Auger electrons cause severe damage to DNA and induce post-mitotic apoptosis in tumor cells. These unique features of $^{64}$Cu-ATSM may contribute to its effectiveness for treating glioblastoma.

Note that the doses of 18.5 MBq, 37 MBq, 74 MBq, 111 MBq and 148 MBq per mouse in the Examples correspond to 75 MBq/kg, 150 MBq/kg, 300 MBq/kg, 450 MBq/kg and 600 MBq/kg, respectively, in terms of human equivalent that is converted using a body surface area conversion factor.

Meanwhile, the internal exposure dose with $^{64}$Cu-ATSM was maximum in the liver, and was 0.108 mSv/MBq. This means that when 150 MBq/kg of $^{64}$Cu-ATSM is administered to a human weighing 60 kg, the exposure dose is 16.2 mGy/kg for the liver and 972 mSv for the whole body. When this exposure dose is applied to normal radiotherapy, it corresponds to an exposure equal to single irradiation of 1.215 Gy, which is lower than the single irradiation dose (1.8 to 2.0 Gy) of normal split irradiation in radiotherapy. Also, when 450 MBq/kg is administered to a human weighing 60 kg, the exposure dose is 48.6 mGy/kg for the liver and 2,916 mSv for the whole body. Since the tolerance dose of the liver in normal split irradiation is 30 Gy as a dose that causes side effects in 5% in 5 years, the total dose when administered a total of four times during normal radiotherapy of about 3 Gy will be 11.66 Gy, which is lower than the tolerance dose of the liver described above.

The present inventors have also reported estimates of irradiation doses of $^{64}$Cu-ATSM for human based on in vivo distribution in normal mouse tissue (see, Yoshii Y, Furukawa T, Matsumoto H, Yoshimoto M, Kiyono Y, Zhang M R, Fujibayashi Y, and Saga T (2016) Cu-ATSM therapy targets regions with activated DNA repair and enrichment of CD133 cells in an HT-29 tumor model: Sensitization with a nucleic acid antimetabolite. Cancer Lett 376: 74-82 and Yoshii Y, Matsumoto H, Yoshimoto M, Furukawa T, Morokoshi Y, Sogawa C, Zhang M R, Wakizaka H, Yoshii H, Fujibayashi Y, and Saga T (2014) Controlled administration of penicillamine reduces radiation exposure in critical organs during $^{64}$Cu-ATSM internal radiotherapy: a novel strategy for liver protection. PloS one 9: e86996). The liver, red bone marrow and ovary have been found to be organs with lower irradiation doses in $^{64}$Cu-ATSM therapy, and the estimated irradiation doses to these tissues in human at a therapeutic dose of $^{64}$Cu-ATSM calculated from the 37 MBq per mouse are lower than the acceptable dose reported as above. Thus, doses in the multiple administration of $^{64}$Cu-ATSM to human according to the present invention can be determined as appropriate based on data of therapeutic effect and toxicity in mouse in the present invention. PET imaging of $^{64}$Cu-ATSM may also be performed to monitor the irradiation dose of tumors and tissues during $^{64}$Cu-ATSM therapy for human according to the present invention, thereby enabling theranostics of cancer.

This application claims priority based on Japanese Patent Application Serial No. 2017-212180, filed Nov. 1, 2017, the entire disclosure of which is hereby incorporated.

The invention claimed is:

1. A method of treating a tumor, which comprises performing multiple administration, at a predetermined time interval, of a radioactive antitumor agent comprising a radioactive dithiosemicarbazone-copper complex as an active ingredient to a living body in need of internal radiotherapy of the tumor at a radioactive dose that (1) effectively kills tumor cells/tissues as determined on the basis of tumor growth inhibition and survival prolongation, and (2) avoids dose-limiting toxicity as determined on the basis of a hematological parameter selected from the group consisting of white blood cell count, red blood cell count and platelet count,
wherein the radioactive dose is from 30 MBq/kg to 450 MBq/kg, and
the radioactive dithiosemicarbazone-copper complex is represented by the following formula (1):

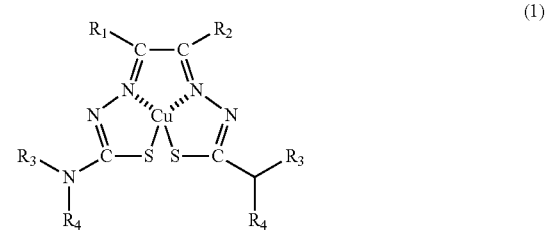

wherein $R_1$, $R_2$, $R_3$, and $R_4$ are each independently selected from the group consisting of a hydrogen atom, an alkyl group, and an alkoxy group, and Cu is a radioisotope of copper selected from the group consisting of $^{64}$Cu and $^{67}$Cu, and
wherein the tumor is a malignant brain tumor.

2. The method according to claim 1, wherein the radioactive dose is a radioactive dose that is from 75 MBg/kg to 300 MBg/kg and avoids statistically significant decrease in two or more kinds of blood cell counts at a significance level set to 5%.

3. The method according to claim 1, wherein the multiple administration consists of intermittent administration at a time interval during which the hematological parameter recovers to a normal range.

4. The method according to claim 3, wherein the time interval during which the hematological parameter recovers to a normal range is a time interval during which the hematological parameter recovers to be equal to the hematological parameter before administration.

5. The method according to claim 1, wherein the radioactive dose is from 100 MBq/kg to 200 MBq/kg.

6. The method according to claim 1, wherein the malignant brain tumor is malignant glioblastoma.

* * * * *